United States Patent
Lettow et al.

(10) Patent No.: US 9,146,392 B2
(45) Date of Patent: Sep. 29, 2015

(54) DIAPHRAGM ARRANGEMENT FOR GENERATING AN OBLIQUE ILLUMINATION IN A MICROSCOPE, AND MICROSCOPE

(71) Applicant: Leica Microsystems (Schweiz) AG, Heerbrugg (CH)

(72) Inventors: Robert Lettow, Winterthur (CH); Paul Gräfenhain, Heerbrugg (CH)

(73) Assignee: LEICA MICROSYSTEMS (SCHWEIZ) AG, Heerbrugg (CH)

( * ) Notice: Subject to any disclaimer, the term of this patent is extended or adjusted under 35 U.S.C. 154(b) by 242 days.

(21) Appl. No.: 13/858,965

(22) Filed: Apr. 9, 2013

(65) Prior Publication Data

US 2013/0271808 A1 Oct. 17, 2013

(30) Foreign Application Priority Data

Apr. 13, 2012 (DE) .......................... 10 2012 206 120

(51) Int. Cl.
   G02B 21/06 (2006.01)
   G02B 5/00 (2006.01)
   G02B 21/08 (2006.01)

(52) U.S. Cl.
   CPC .............. G02B 21/06 (2013.01); G02B 5/005 (2013.01); G02B 21/082 (2013.01)

(58) Field of Classification Search
   CPC ....... G02B 21/06; G02B 21/082; G02B 5/005
   USPC ................. 359/227, 233, 234, 236, 368, 894; 396/458, 461, 493, 495, 505, 506
   See application file for complete search history.

(56) References Cited

U.S. PATENT DOCUMENTS

| | | | |
|---|---|---|---|
| 863,805 A | * | 8/1907 | Ott ................................ 359/388 |
| 6,563,113 B1 | * | 5/2003 | Amann et al. ................ 250/309 |

FOREIGN PATENT DOCUMENTS

| | | |
|---|---|---|
| DE | 35 27 426 | 7/1986 |
| DE | 10 2009 026 555 | 5/2011 |
| JP | 2009014772 | 1/2009 |

* cited by examiner

*Primary Examiner* — Scott J Sugarman
*Assistant Examiner* — Wen Huang
(74) *Attorney, Agent, or Firm* — Hodgson Russ LLP

(57) ABSTRACT

A diaphragm arrangement (100) for generating an oblique illumination in a microscope comprises a carrier element (130), an iris diaphragm element (110) having a variable iris diaphragm opening (111), a further diaphragm element (120) having a diaphragm opening (121) that, when it is in a first position relative to the carrier element (130), covers a portion of the iris diaphragm opening (111) and is mounted rotatably around a first rotation axis (A), such that a rotation of the further diaphragm element (120) around the first rotation axis (A) changes that portion of the iris diaphragm opening (111) which is covered by the further diaphragm element (120), and an actuation element (140) coupled to the further diaphragm element (120) via a coupling device (150) such that a rotation of the further diaphragm element (120) around the first rotation axis (A) is produced by an actuation of the actuation element (140).

11 Claims, 2 Drawing Sheets

DIAPHRAGM ARRANGEMENT FOR GENERATING AN OBLIQUE ILLUMINATION IN A MICROSCOPE, AND MICROSCOPE

CROSS REFERENCE TO RELATED APPLICATIONS

This application claims priority of German patent application number 10 2012 206 120.7 filed Apr. 13, 2012, the entire disclosure of which is incorporated by reference herein.

FIELD OF THE INVENTION

The present invention relates to a diaphragm arrangement for generating an oblique illumination in a microscope, and to a microscope having such a diaphragm arrangement.

BACKGROUND OF THE INVENTION

The use of oblique illumination to investigate objects is advantageous for structured samples, since the surface structures results in diffraction effects that make the surface appear sculptural and contrasty. An oblique illumination is often used for investigating wafers or metal surfaces.

An "oblique illumination" is understood according to item 2.20.6 of DIN ISO 10934-1 as an "illumination having a ray bundle whose axis forms an angle with the optical axis of the microscope." An oblique illumination is usually generated by introducing an aperture diaphragm into the illumination beam path and shifting it laterally outward away from the optical axis. A diaphragm arrangement of this kind for generating an oblique illumination in a microscope is presented, for example, in DE 35 27 426 C1, in which an iris diaphragm element is held on a threaded rod and can be shifted laterally by the rotation of a nut and of the threaded rod, so as thereby to modify the illumination angle. Actuation is cumbersome and time-consuming.

DE 10 2010 042 351 describes a microscope illumination system having a diaphragm device, which system generates an incident-light beam path proceeding decentrally with respect to the optical axis. The decentering is achieved by means of a rotatable diaphragm disk having different diaphragm openings. The diaphragm disk is located in the illumination aperture plane, and possesses multiple different diaphragm openings that correspond to the images of the various objective pupils.

Proceeding from this existing art, what is desired is a diaphragm arrangement with which, in particular, the illumination angle can be quickly and easily modified.

SUMMARY OF THE INVENTION

A diaphragm arrangement for generating an oblique illumination in a microscope as well as a microscope having such a diaphragm arrangement are proposed according to the present invention. Advantageous embodiments are the subject matter of the description which follows.

Advantages of the Invention

The present invention presents a diaphragm arrangement with which, in particular, the illumination angle of an oblique illumination can be quickly and easily modified. The diaphragm arrangement is notable for a robust design with simple and fast operation. The diaphragm arrangement nevertheless enables exact positioning of a diaphragm element in the illumination beam path of a microscope, so that a lateral portion of the illumination ray bundle is blocked out and an oblique illumination is produced. The illumination angle can be varied in a precise and controlled manner by actuating an actuation device. The diaphragm element is rotatably mounted. In addition to the diaphragm element for oblique illumination, a conventional illumination aperture diaphragm (e.g. an iris diaphragm) is also provided, enabling a further improvement in contrast adjustment.

The actuation device is preferably rotatable, in particular as an adjusting wheel, in order to actuate the diaphragm element for oblique illumination. This simplifies manual operation in particular, so that expensive and complex motorized systems can be omitted. Stop elements are preferably provided in order to limit the rotation of the actuation element in one or both rotation directions. The coupling between the actuation element and the diaphragm element for oblique illumination is made available by corresponding coupling means.

The coupling means preferably transform a rotation of the actuation element into a rotation of the diaphragm element for oblique illumination.

The diaphragm element can preferably be introduced into the illumination beam path so that it is located in a first position and blocks out a portion of the illumination ray bundle in order to generate an oblique illumination, and it can be brought into a second position in which it substantially does not block out the portion of the illumination ray bundle, in order to generate straight-line illumination. Very particularly preferably, this positional change is also caused by an actuation of the same actuation element. The positional change can be conveyed by way of a linear motion that is possessed by a guide in the form of a peg or pin guided in an elongated hole.

Further advantages and embodiments of the invention are evident from the description.

It is understood that the features recited above and those yet to be explained below are usable not only in the respective combination indicated, but also in other combinations or in isolation, without departing from the scope of the present invention.

The invention is schematically depicted in the drawings on the basis of an exemplifying embodiment, and will be described in detail below with reference to the drawings.

BRIEF DESCRIPTION OF THE DRAWING FIGURES

FIG. 1 schematically shows basic optical elements of a microscope according to the present invention.

DETAILED DESCRIPTION OF THE INVENTION

Figure 1:
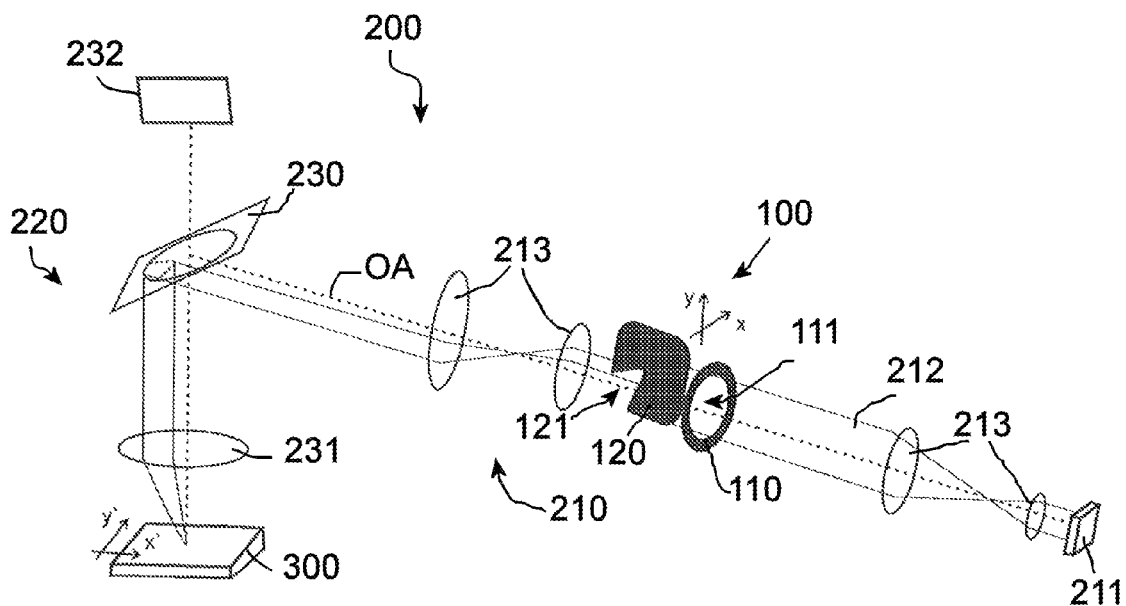

The Figures will be described below in continuous and overlapping fashion, and identical elements are labeled with identical reference characters.

Figure 2:
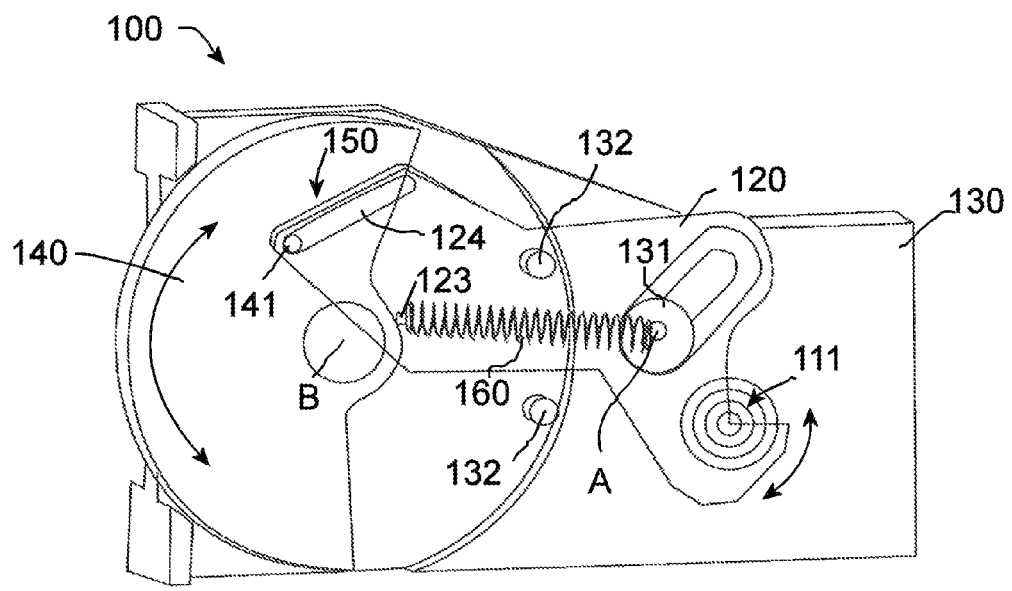
FIG. 2 is a perspective view of a preferred embodiment of a diaphragm arrangement according to the present invention in a first position, such that the further diaphragm element covers a portion of the iris diaphragm opening.
Figure 3:
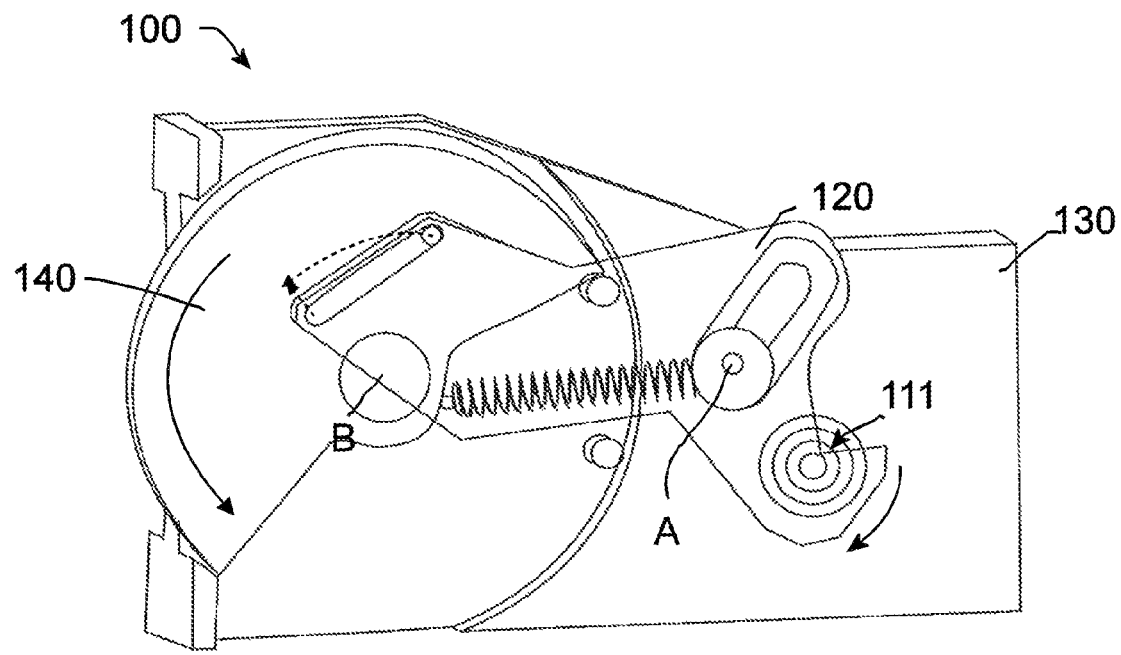
FIG. 3 shows the diaphragm arrangement of FIG. 2, such that the further diaphragm element covers a larger portion of the iris diaphragm opening.
Figure 4:
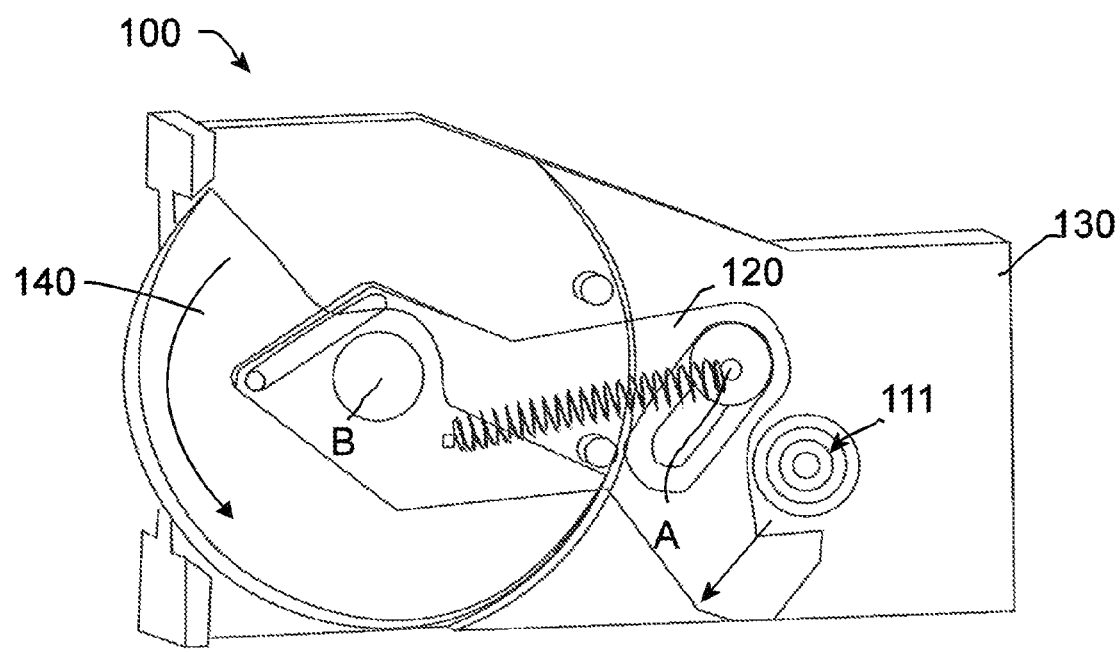
FIG. 4 shows the diaphragm arrangement of FIG. 2 in a second position in which the further diaphragm element does not cover the iris diaphragm opening.

FIG. 1 is a perspective depiction of basic optical elements of a microscope 200 according to the present invention having a preferred embodiment of a diaphragm arrangement 100 according to the present invention, the diaphragm arrangement itself being shown in different positions in FIGS. 2 to 4.

Microscope 200 comprises an illumination beam path 210 as well as an observation beam path 220, which merge at a beam splitter 230. Illumination beam path 210 has a light source 211 that radiates an illumination ray bundle 212 along an optical axis OA. Arranged in the illumination beam path are lenses 213 that, as is known, perform imaging functions such as generating aperture planes and field planes.

Beam splitter 230 is followed by an objective 231 and by object 300 to be observed; a viewing element 232, for example an eyepiece or a camera, sits at the end of the observation beam path.

Diaphragm arrangement 100 comprises an iris diaphragm 110 having a variable iris diaphragm opening 111, i.e. one that is adjustable in size, that is usefully arranged in or near an illumination aperture plane. Diaphragm arrangement 100 furthermore comprises a further diaphragm element 120, located close to iris diaphragm opening 111, having a diaphragm opening 121; in accordance with the preferred embodiment depicted here, further diaphragm element 120 can be brought, by a first motion, into two different positions relative to a carrier element 130 or to optical axis OA. This is evident in FIGS. 2 to 4. Diaphragm opening 121 of the further diaphragm element is embodied here as a recess of fixed size, open toward the edge of the further diaphragm element and here having a sector-shaped cutout. A curved, e.g. parabolic, cutout is also preferred.

Diaphragm arrangement 100 is illustrated in FIGS. 2 and 3 in the first position, in which a portion of iris diaphragm opening 111 is covered by diaphragm element 120. FIG. 4 illustrates the diaphragm arrangement in the second position relative to carrier element 130, in which diaphragm element 120 substantially covers no portion of iris diaphragm opening 111.

Besides carrier element 130, iris diaphragm element 110, and further diaphragm element 120, diaphragm arrangement 100 comprises an actuation element 140 that is coupled to further diaphragm element 120 via a coupling device 150 in such a way that a rotation of further diaphragm element 120 around a first rotation axis A is produced by an actuation of actuation element 140. First rotation axis A is defined by a second peg 131 that is arranged on carrier element 130.

The actuation element itself is mounted rotatably around a second rotation axis B different from the first rotation axis A, the actuation of actuation element 140 being a rotation around second rotation axis B. Actuation element 140 is embodied here in the manner of an adjusting wheel. Two stop elements 132 are provided, which are embodied to limit the rotation of adjusting wheel 140 around second rotation axis B. Stop elements 132 are embodied on carrier element 130.

Coupling device 150 comprises a first elongated hole 124 that is embodied in further diaphragm element 120, and a first peg 141 which is mounted displaceably therein and embodied on actuation element 140. Coupling device 150 produces a coupling between actuation element 140 and further diaphragm element 120 in such a way that a rotation of actuation element 140 around second rotation axis B produces a rotation of further diaphragm element 120 around first rotation axis A when further diaphragm element 120 is in the first position relative to carrier element 130.

FIG. 3 illustrates a situation in which the diaphragm arrangement is in the first position relative to carrier element 130, and actuation element 140 is located against a stop, so that the largest possible portion of iris diaphragm opening 111 is covered by diaphragm element 120. A counter-clockwise rotation of the actuation element around second rotation axis B here causes first peg 141 to be guided, likewise counter-clockwise, in first elongated hole 124 and thereby also to displace elongated hole 124 relative to carrier element 130. First peg 141 slides in first elongated hole 124 as far as the opposite end, which it has reached in FIG. 2. This leads to a clockwise rotation of diaphragm element 120 around first rotation axis A, and thereby to a change in the covered portion of iris diaphragm opening 111.

Coupling device 150 is embodied so that in the position according to FIG. 2, first elongated hole 124 extends through first peg 141 substantially tangentially to a circle around second rotation axis B, whereas when first peg 141 is located at the opposite end of first elongated hole 124, as depicted in FIG. 3, a definite deviation from the tangential orientation is evident. This functions in the manner of a cosine drive, so that the transmission ratio between the actuation and the diaphragm motion, produced thereby, out of the position according to FIG. 2 to the position according to FIG. 3 becomes increasingly larger. What can be achieved thereby is that the change in the covered portion of iris diaphragm opening 111 is initially relatively small, and becomes greater toward the end. This facilitates exact setting with small pupils.

Proceeding from the end position of the first position, shown in FIG. 2, diaphragm element 120 can be brought, by further counter-clockwise rotation of actuation element 140, into the position shown in FIG. 4, in which iris diaphragm opening 111 is substantially uncovered. Once first peg 141 has reached the lower end (in the Figure) of first elongated hole 124, a further counter-clockwise rotation results in entrainment of the entire further diaphragm element 120 into the second position. The entrainment occurs in a first motion that, in this case, is a linear motion guided by second peg 131 and by a second elongated hole 122 in the further diaphragm element.

A tension spring 160, which connects further diaphragm element 120 under tension to second peg 131, is provided in order to hold diaphragm arrangement 120 in the first position as long as a rotation of actuation element 140 due to displacement of peg 141 in first elongated hole 124 is enabled. The further counter-clockwise rotation proceeding from FIG. 2 occurs against the tension force of tension spring 160 until a switch position is reached, said position being characterized by the greatest distance between an attachment point 123 of the tension spring on the further diaphragm element, and second peg 131. When this point is overridden, actuation element 140 is pulled by the tension spring against lower stop 132, causing an entrainment of further diaphragm element 120 along second peg 131 into the second position depicted in FIG. 4.

Although the invention is described and shown in the Figures on the basis of an incident illumination, it is understood that the diaphragm arrangement according to the present invention is also suitable for transmitted illumination.

What is claimed is:

1. A diaphragm arrangement (100) for generating an oblique illumination in a microscope (200), comprising:
    a carrier element (130);
    an iris diaphragm element (110) having a variable iris diaphragm opening (111);
    a further diaphragm element (120) mounted for rotation about a first rotation axis (A) and having a diaphragm opening (121), the further diaphragm element (120) having a first position relative to the carrier element (130) in which the further diaphragm element (120) covers a portion of the iris diaphragm opening (111), wherein a rotation of the further diaphragm element (120) about the first rotation axis (A) changes the portion of the iris diaphragm opening (111) which is covered by the further diaphragm element (120); and an actuation element (140) coupled to the further diaphragm element (120) via a coupling device (150) such that a rotation of the further diaphragm element (120) about the first rotation axis (A) is produced by an actuation of the actuation element (140);

wherein the further diaphragm element (120) is conveyable by a first motion of the further diaphragm element (120) into a second position relative to the carrier element (130), in which second position the further diaphragm element (120) covers no portion of the iris diaphragm opening (111);

wherein the first motion is a linear motion;

wherein the linear motion is guided by a second elongated hole (122) and a second peg (131) received by the second elongated hole (122); and wherein the second elongated hole (122) is embodied in the further diaphragm element (120), and the second peg (131) is embodied on the carrier element (130).

2. The diaphragm arrangement (100) according to claim 1, wherein the actuation element (140) is mounted for rotation about a second rotation axis (B) different from the first rotation axis (A), wherein the actuation of the actuation element (140) is a rotation about the second rotation axis (B).

3. The diaphragm arrangement (100) according to claim 2, comprising at least one stop element (132) arranged to limit the rotation of the actuation element (140) about the second rotation axis (B) in at least one rotational direction.

4. The diaphragm arrangement (100) according to claim 3, comprising a first stop element (132) arranged to limit the rotation of the actuation element (140) about the second rotation axis (B) in a first rotational direction, and a second stop element (132) arranged to limit the rotation of the actuation element (140) about the second rotation axis (B) in a second rotational direction.

5. The diaphragm arrangement (100) according to claim 1, wherein the coupling device (150) comprises a first elongated hole (124) and a first peg (141) mounted displaceably therein.

6. The diaphragm arrangement (100) according to claim 5, wherein the first elongated hole (124) is embodied in the further diaphragm element (120), and the first peg (141) is embodied on the actuation element (140).

7. The diaphragm arrangement (100) according to claim 1, wherein the actuation element (140) is coupled to the further diaphragm element (120) via the coupling device (150) such that the first motion is producible by an actuation of the actuation element (140).

8. The diaphragm arrangement (100) according to claim 1, wherein the first rotation axis (A) is defined by the second peg (131).

9. The diaphragm arrangement (100) according to claim 1, wherein a tension spring (160) connects the further diaphragm element (120) to the second peg (131).

10. The diaphragm arrangement (100) according to claim 1, wherein the diaphragm opening (121) is a recess open toward an edge of the further diaphragm element (120).

11. The diaphragm arrangement (100) according to claim 10, wherein the recess is of fixed size.

* * * * *